(12) United States Patent
Schuknecht

(10) Patent No.: US 12,549,125 B2
(45) Date of Patent: Feb. 10, 2026

(54) PHOTOVOLTAIC MODULE MOUNTING RAILS

(71) Applicant: Array Tech, Inc., Albuquerque, NM (US)

(72) Inventor: Nathan Schuknecht, Golden, CO (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 18/930,587

(22) Filed: Oct. 29, 2024

(65) Prior Publication Data

US 2025/0150023 A1   May 8, 2025

Related U.S. Application Data

(60) Provisional application No. 63/596,146, filed on Nov. 3, 2023.

(51) Int. Cl.
*H02S 20/30* (2014.01)
(52) U.S. Cl.
CPC .................................... *H02S 20/30* (2014.12)
(58) Field of Classification Search
None
See application file for complete search history.

(56) References Cited

U.S. PATENT DOCUMENTS

| | | | | |
|---|---|---|---|---|
| 11,949,373 | B1* | 4/2024 | Jasmin | H02S 30/10 |
| 2012/0192925 | A1* | 8/2012 | Grushkowitz | H10F 19/90 |
| | | | | 136/251 |
| 2014/0061396 | A1* | 3/2014 | Magno, Jr. | F16L 3/10 |
| | | | | 248/72 |
| 2015/0200621 | A1* | 7/2015 | Reed | F24S 25/636 |
| | | | | 29/525.01 |
| 2018/0367093 | A1* | 12/2018 | Ayers | H02S 20/25 |
| 2019/0081469 | A1* | 3/2019 | Shea | H02G 3/32 |
| 2020/0076360 | A1 | 3/2020 | Watson | |
| 2020/0366076 | A1* | 11/2020 | Naugler | F16L 3/13 |
| 2021/0033220 | A1* | 2/2021 | Laughlin | F16L 3/13 |
| 2023/0070097 | A1 | 3/2023 | Watson | |
| 2023/0246589 | A1 | 8/2023 | Morankar | |

OTHER PUBLICATIONS

European Patent Office; International Search Report and Written Opinion issued in Int'l App No. PCT/US2024/053442 dated Jan. 27, 2025; 9 pages.

* cited by examiner

*Primary Examiner* — Steven M Marsh
(74) *Attorney, Agent, or Firm* — MASCHOFF BRENNAN

(57) ABSTRACT

An on-site photovoltaic (PV) module assembly system and process may involve customizing assembly of a row of PV modules at the location of a particular solar site. Mounting rails or other mounting structures configured to interface a PV module with a torque tube may be positioned along the torque tube on site to account for physical characteristics and properties of the particular solar site. PV modules may be attached to one or more of the mounting rails by an adhesive. Using the adhesive to attach the PV modules to the mounting rails may increase the flexibility of PV module installation along the torque tube. Use of the adhesive may also decrease the number of fastening components included with the mounting rail and the PV module, such as a structural rail or module rails.

15 Claims, 18 Drawing Sheets

PHOTOVOLTAIC MODULE MOUNTING RAILS

CROSS-REFERENCE TO RELATED APPLICATION

This application claims priority under 35 U.S.C. § 119 to U.S. Provisional Application No. 63/596,146, filed Nov. 3, 2023, the entire disclosure of which is incorporated herein by reference.

TECHNICAL FIELD

The present disclosure generally relates to photovoltaic module mounting rails that can be used to secure photovoltaic modules to support structures.

BACKGROUND

Commercial solar sites, such as solar farms, use photovoltaic (PV) modules to generate power. These solar farms often include a large number of PV modules, which are coupled to support structures, such as torque tubes, and arranged in a series of rows. To facilitate the coupling of PV modules to torque tubes, some PV modules have one or more module rails that are attached to the backsides or perimeter edges of the PV modules. Module rails that surround some or all perimeter edges of a PV module are sometimes referred to as a "frame." Manufacturers of PV modules often attach these module rails as part of the off-site manufacturing process and prior to shipping the PV modules to commercial sites for installation.

Module rails, however, cannot be coupled directly to torque tubes. Thus, once on-site at a solar farm, installation technicians are often required to use additional components to couple the PV modules to the torque tubes. These additional components, or mounting assemblies, are configured to be secured both to the module rail on a PV module as well as to a torque tube. Thus, mounting assemblies along with module rails, are both intermediary components that are often necessary to indirectly couple PV modules to torque tubes.

In addition to facilitating the coupling of PV modules to torque tubes, module rails also provide structural support to PV modules. The amount of structural support provided depends on the specifications of the module rails. These specifications can include, for example, a length of the module rail (in the case of a module rail that is attached to the backside of a PV module) or the amount of the PV module that the module rail surrounds (in the case of a module rail that is attached to a perimeter edge or edges of the PV module). As the length of a module rail increases, so does the amount of structural support provided to the PV module. Similarly, as the amount of PV module that is surrounded by a module rail increases, so does the amount of structural support provided to the PV module. PV module manufacturers, however, often do not provide options for module rail specifications. To the contrary, manufacturers often provide only a single option for module rails with consistent specifications.

Current PV module installation practices that require both module rails and support structures create a number of inefficiencies. First, module rails and mounting assemblies are repetitive structures. They both provide mechanisms for securing a PV module to a torque tube. However, because module rails cannot be secured directly to torque tubes and because mounting assemblies cannot be secured directly to PV modules, both are necessary under current installation practices.

Second, given that module rails are attached to PV modules during the manufacturing process (and prior to being shipped to solar farm locations), they create significant density inefficiencies in transporting PV modules. This is because module rails can significantly increase the space required to ship PV modules.

Third, providing only a single option for module rail specifications (which manufacturers often do) leads to more or less structural support than is required. This is because installation technicians that are on-site at solar farms cannot select and use an appropriate module rail to meet the specific needs of the location. They are forced to use the module rails that are attached to PV modules by the off-site manufacturer. For example, locations that receive heavy snow fall during winter months may require module rails that provide additional structural support compared to the module rails that adequately meet the needs of locations that do not receive heavy snow fall. In addition, PV modules that are located on the outer edges of a solar farm are often exposed to more severe environmental elements, such as stronger winds, than PV modules that are located within the outer edges of the solar farm. Thus, the module rails attached to PV modules at the outer edges of the solar farm may require additional structural support compared to the PV modules that are located within the outer edges. Without some ability to select and use module rails with appropriate specifications to meet the needs of a specific PV module, it is possible that an insufficient amount of structural support is provided to some PV modules while an unnecessarily large amount of structural support is provided to others.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

The inefficiencies associated with current PV module installation practices may be resolved by embodiments provided herein, which provide a combined module rail and mounting assembly structure, hereafter referred to as a "mounting rail." In one embodiment, a mounting rail may be directly attachable to both a PV module and a support structure. Thus, the mounting rails of the present disclosure may eliminate the need for separate module rails and mounting assemblies, as these components are reduced to a single structure.

In addition, embodiments of the present disclosure also provide a method for installing PV modules on-site at solar installation locations. This method may include receiving PV modules at a solar site, attaching a mounting rail to the PV module at the solar site, and securing the mounting rail to a support structure at the solar site. Because the mounting rails are attached to PV modules on-site, different mounting rails having different specifications may be used depending on the needs of the PV module to which they are attached. For example, mounting rails with a longer rail element may be secured to PV modules that are on an outside perimeter of a solar farm while mounting rails with shorter rail elements may be used on PV modules within the outer perimeter.

Further, because the mounting rails are not attached to PV modules until after they arrive at the location of a solar site, the PV modules may be shipped without these components pre-attached. This resolves the density inefficiencies that are created when PV modules are attached to module rails prior to shipping.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Unlike many conventional mounting systems, the mounting rails described herein are configured to be directly secured to both a PV module and a support structure. Thus, the mounting rails of the present disclosure can alone be used to secure a PV module to a support structure without the need for any additional intermediate components, which are often required in conventional mounting systems. These additional intermediate components often include a module rails and mounting assemblies. Module rails are often attached to PV modules as part of an off-site manufacturing process. Module rails include rails that are secured to a backside of a PV module and rails that surround a perimeter of a PV module (which are also referred to as a "frame"). Mounting assemblies often include mechanisms to be attached to both a module rail and a support structure, such as a torque tube. Embodiments of the mounting rails disclosed herein are explained with reference to the accompanying figures.

Figure 1A:
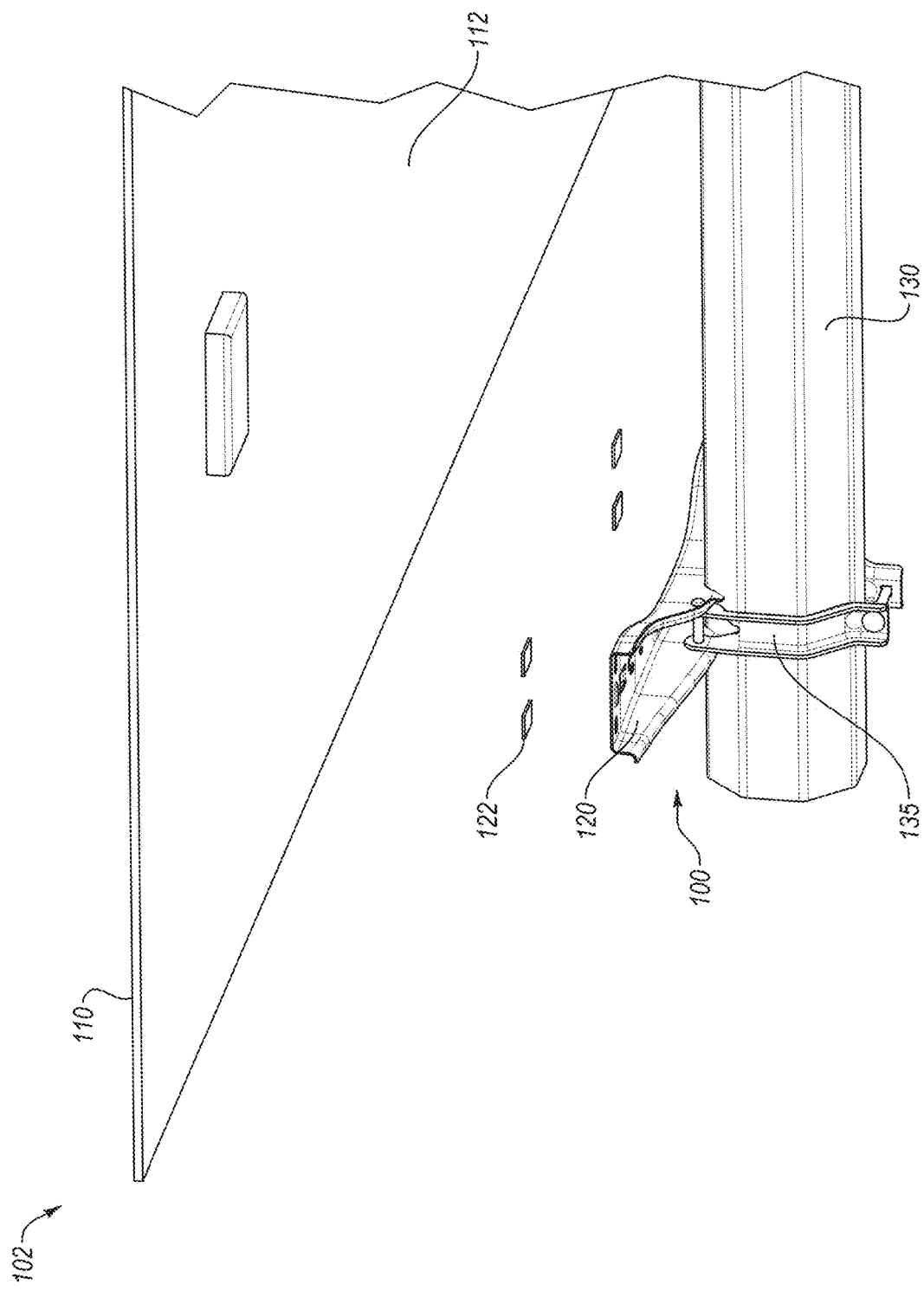
FIGS. 1A and 1B illustrate exploded views of a first embodiment of a mounting rail according to one or more embodiments of the present disclosure.
Figure 1B:
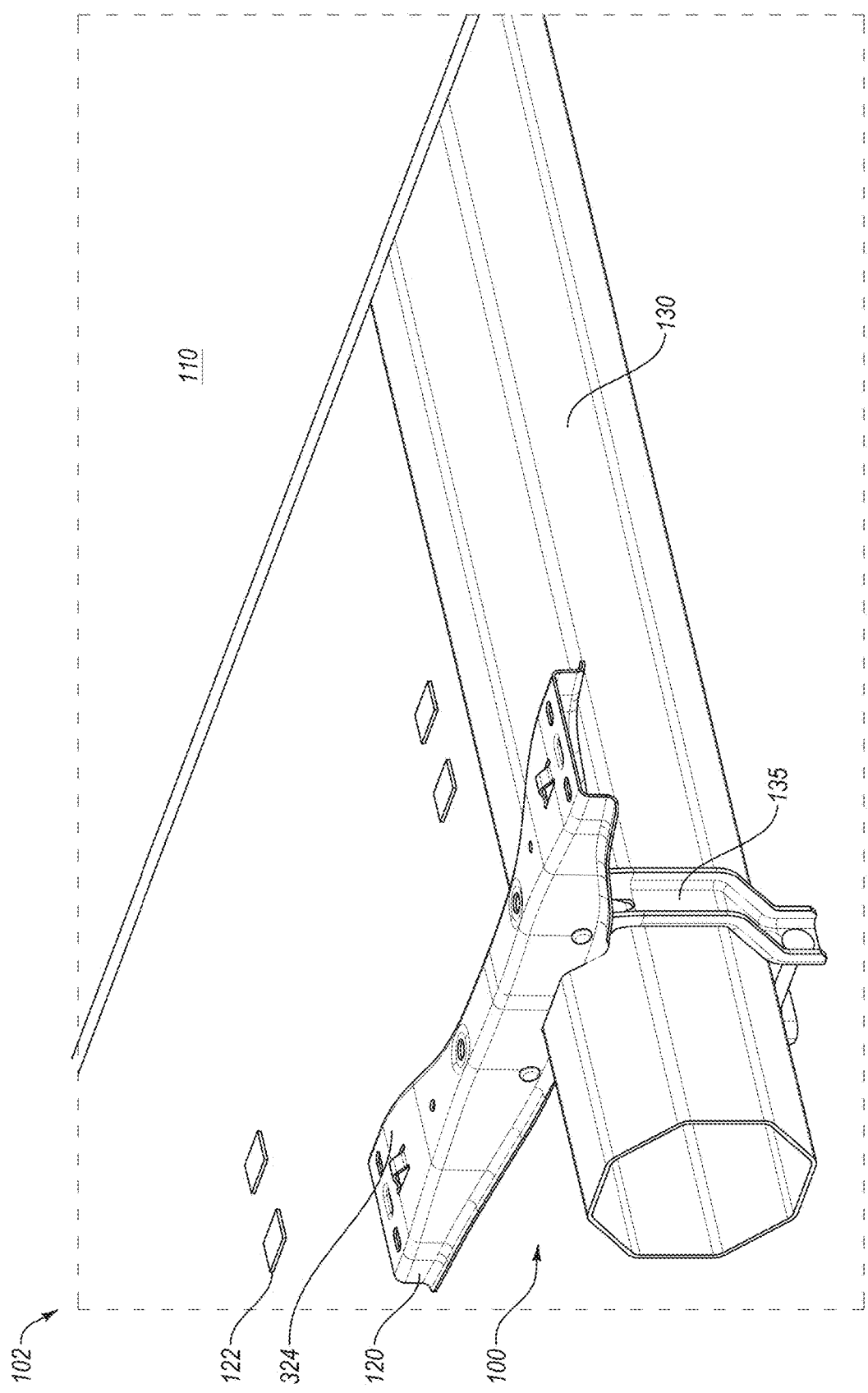

FIGS. 1A and 1B illustrate exploded views of a first embodiment of a mounting rail 100 according to one or more embodiments of the present disclosure. The mounting rail 100 is part of a system 102 that includes the mounting rail 100, a PV module 110, and a torque tube 130. FIG. 1A illustrates a bottom perspective view of the mounting rail 100, which secures the PV module 110 to the torque tube 130. FIG. 1B illustrates a top perspective view of the mounting rail 100, the PV module 110, and the torque tube 130.

The mounting rail 100 includes a rail element 120 and a mounting bracket 135. The rail element 120 may be directly connected to a back surface 112 of the PV module 110. This direct connection between the rail element 120 and the PV module 110 may be accomplished through the use of adhesive tabs 122. These adhesive tabs 122 may be attached between a top surface of the rail element 120 and a back surface 112 of the PV module 110.

The adhesives described herein, regardless of their form or shape (for example, tabs as shown in FIGS. 1A and 1B or strips as shown in other embodiments) may be hot-melt adhesives. Hot-melt adhesives may include polymeric compounds that are heated and melted before application to relevant surfaces to bind two or more surfaces together. For example, the adhesives described herein may include an Ethylene Vinyl Acetate-based (EVA-based) copolymeric compound, an Amorphous Poly-Alpha-Olefin-based (AFAO-based) compound, a Buytl-based compound, or another hot-melt adhesive compound. Additionally or alternatively, the adhesives described herein may be chemical-curing adhesives, such as a thermoset polymer or an epoxy-based compound; a caulking compound, such as a silicone-based adhesive; or some combination thereof. An appropriate adhesive may be selected based on properties of the solar site where the adhesive is to be used to connect a rail element to a PV module. For example, heat-resistant or moisture-resistant adhesives may be selected for solar sites that are expected to experience hotter temperatures or higher humidity, respectively. In addition to adhesive, other fastening mechanisms may be used to connect a rail element to a PV module. For example, in some embodiments, a nail, screw, clamp, or other fastening mechanism may be used.

The mounting rail 100 also includes a mounting bracket 135. The mounting bracket 135 may be directly secured to a support structure, such as the torque tube 130. The mounting bracket 135 includes two separate arms that are pivotally attached to the rail element 120 so that a distance between ends of these arms may be increased to fit around an outer surface of the torque tube 130. A nut and bolt, or other fastening mechanism may be used to reduce the distance between the ends of the arms of the mounting bracket 135 once around the torque tube 130, thereby compressing the torque tube 130 between the arms of the mounting bracket 135 and creating a friction attachment to the torque tube 130.

In some embodiments, a coupling mechanism other than a mounting bracket may be used to couple the mounting rail to a support structure. For example, a band strap, a direct connection (such as bolting the mounting rail directly to the support structure), or a wire form may be used.

The back surface 112 of the PV module 110 may be made of any metals, plastics, glass, or composite materials that are capable of supporting the weight and size of the PV cells and other layers positioned on top of the back surface 112, which make up the PV module 102.

In some embodiments, the rail element 120 and the mounting bracket 135 may be installed on-site at a solar site, such as a solar farm. In such an embodiment, the PV module 110 may be received at the solar site without any installation hardware being secured to the PV module 110. For example, the PV module 110 may not arrive at the solar site with the mounting rail 100 or any other type of rail pre attached. Instead, the mounting rail 100 may be secured to the back side 112 of the PV module 110 by on-site technicians as part of the installation process.

Mounting rails of the present disclosure may be secured to PV modules in different locations. For example, the mounting rail 100 is secured to a perimeter edge of the PV module 110. Indeed, the mounting rail 100 is configured to be secured to perimeter edges of two separate PV modules (a second PV module is not shown): one on a first side of the rail element 120 and another PV module on a second side of the rail element 120. However, in other embodiments, mounting rails may be secured to bottom surfaces of PV modules away from perimeter edges and closer to a center of PV module. Such an embodiment is shown in FIGS. 2A and 2B.

Figure 2A:
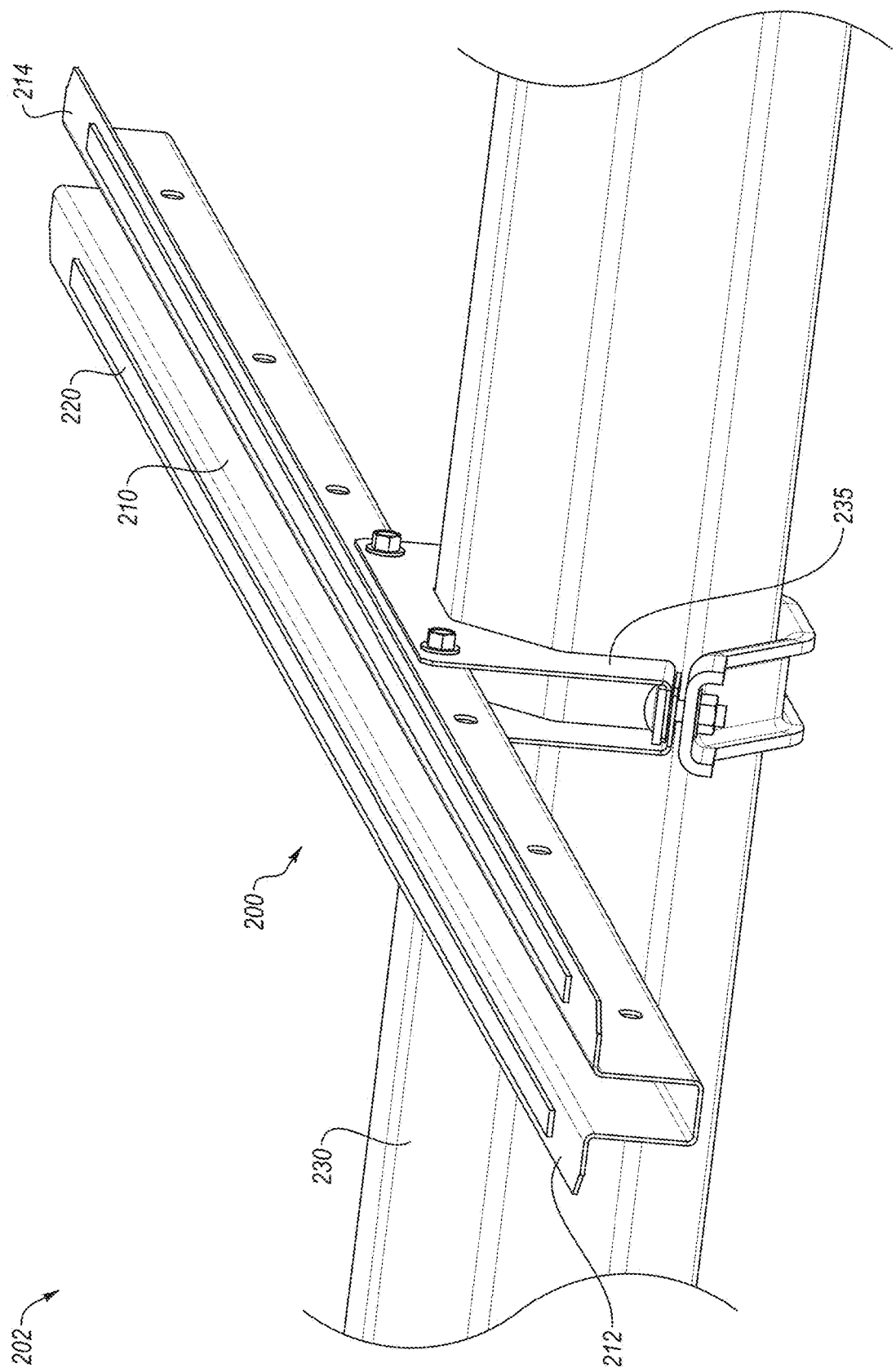
FIGS. 2A and 2B illustrate a second embodiment of a mounting rail according to one or more embodiments of the present disclosure.
Figure 2B:
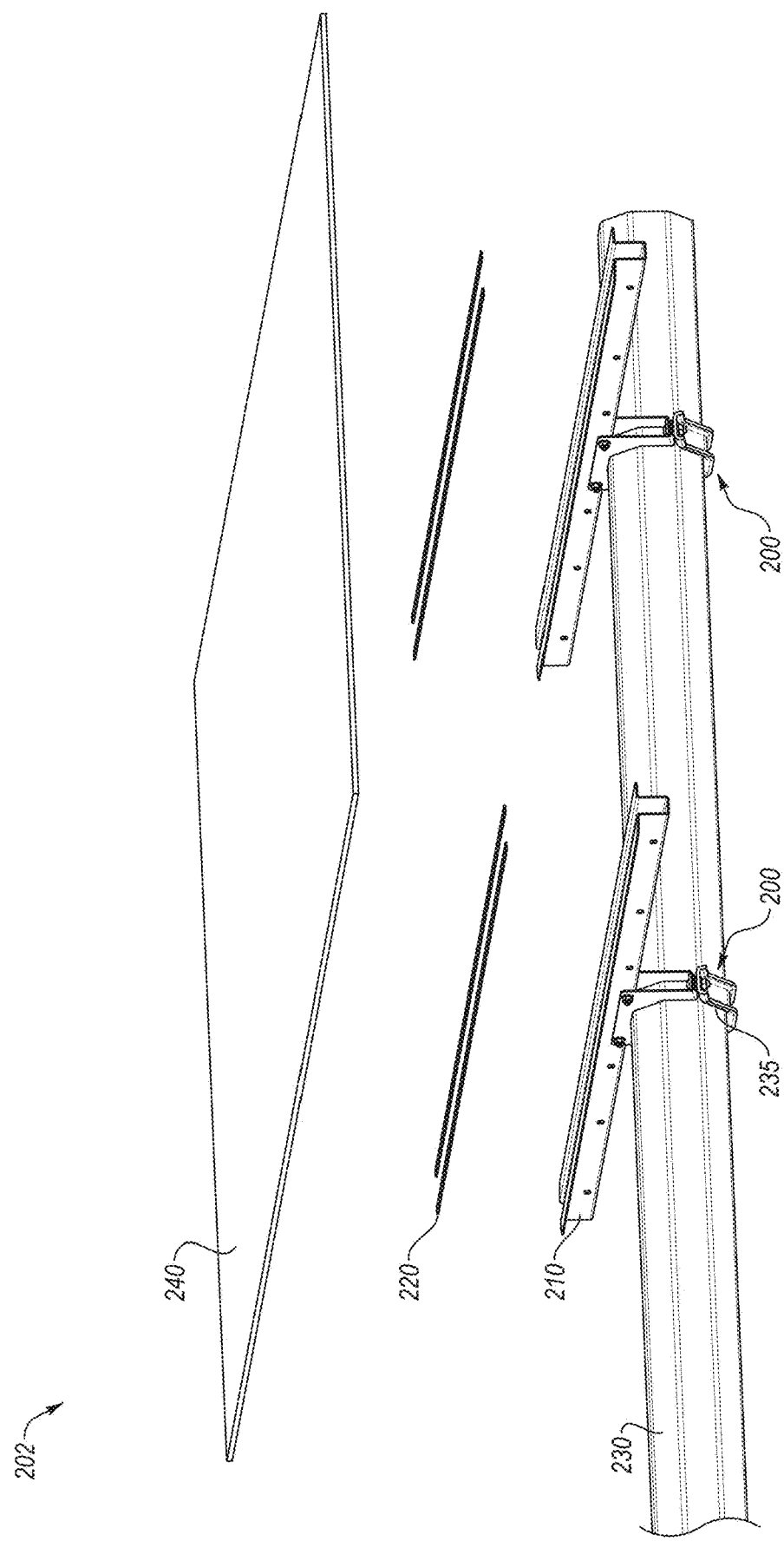

FIGS. 2A and 2B illustrate a second embodiment of a mounting rail 200 according to one or more embodiments of the present disclosure. The mounting rail 200 is part of a system 202 that includes the mounting rail 200, a PV module 240 (shown in FIG. 2B), and a torque tube 230. FIG. 2A illustrates a perspective view of the mounting rail 200, which is secured to the torque tube 230. The mounting system 200 includes a rail element 210. The rail element 210 includes two flanges 212 and 214 that extend in the direction of the length of the torque tube 230. Adhesive strips 220, which are positioned on the tops of the two flanges 212 and 214, may be used to directly connect the rail element 210 of the mounting system 200 to a PV module (not shown).

As shown in FIG. 2A, the adhesive strips 220 may be applied along substantially the entire length of a top surface of the flanges 212 and 214. However, in other embodiments, adhesive strips may be applied to less than the entire length of a rail element. For example, in other embodiments, adhesive tabs may be applied at discrete locations along the top surfaces of the flanges 212 and 214.

The mounting rail 200 also includes a mounting bracket 235. The mounting bracket 235 is attached to the rail element 210 and is configured to be directly secured to an outer surface of the torque tube 230. For example, the mounting bracket 235 includes an upper portion, which is attached to the rail element 210, and a lower portion. Together, the upper and lower portions of the mounting bracket 235 enclose, or substantially enclose, the torque tube 230 to create a friction attachment thereto.

Any number of mounting rails may be used to secure a PV module to a support structure. For example, FIG. 2B illustrates an exploded view of a pair of mounting rails 200 that are secured to the torque tube 230 and a PV module 240. As can be seen in FIG. 2B, the mounting rails 200 are not secured to perimeter edges of the PV module 240, but rather within the outer perimeter and more toward a center of the PV module 240. The locational placement of a mounting rail may have an impact on the structural support provided by the mounting rail. For example, due to a size of a PV module or environmental conditions at a solar site, securing mounting rails to perimeter edges (such as mounting rail 100 shown in FIG. 1) may not be an option as the weight of the PV module or environmental conditions may cause it to fail if it is only secured along one or more edges. Thus, a location where a mounting rail is secured to a PV module may be an important consideration to ensure that PV modules are adequately supported.

A number of mounting rails used to secure a PV module to a torque tube may also have an impact on the amount of structural support provided by the mounting rails. For example, using more mounting rails may increase an amount of structural support that is provided by the mounting rails to a PV module. In the embodiment shown in FIG. 2B, where two separate mounting rails 200 are used to secure the PV module 240 to the torque tube 230, provide more support to the PV module 240 than would be provided by a single mounting rail 200.

A length of the rail element of a mounting rail may also increase an amount of structural support that is provided by the mounting rails to a PV module. For example, as the length of the rail element 210 increases, the amount of structural support that is provided by the mounting rails 200 to the PV module 240 will also likely increase. The rail elements of mounting rails 200 are longer and thus provide more support that the mounting rails 100, which are substantially shorter.

In addition, an amount of adhesive that is applied between a rail element and a PV module may also have an impact on an about of structural support that is provided by a mounting rail to a PV module. For example, the size of the adhesive strips 220 may be varied depending on an expected load to be experienced by the PV module 240. For example, if the PV module 240 is to be positioned closer to exterior regions in a particular row of PV modules, it may be expected to bear greater loads than PV modules that are positioned closer to interior regions of the particular row. Consequently, a larger adhesive strip 220 may be applied to the rail elements 210, while shorter adhesive strips or tabs may be used to with PV modules located in the interior regions of the particular row.

Figure 3:
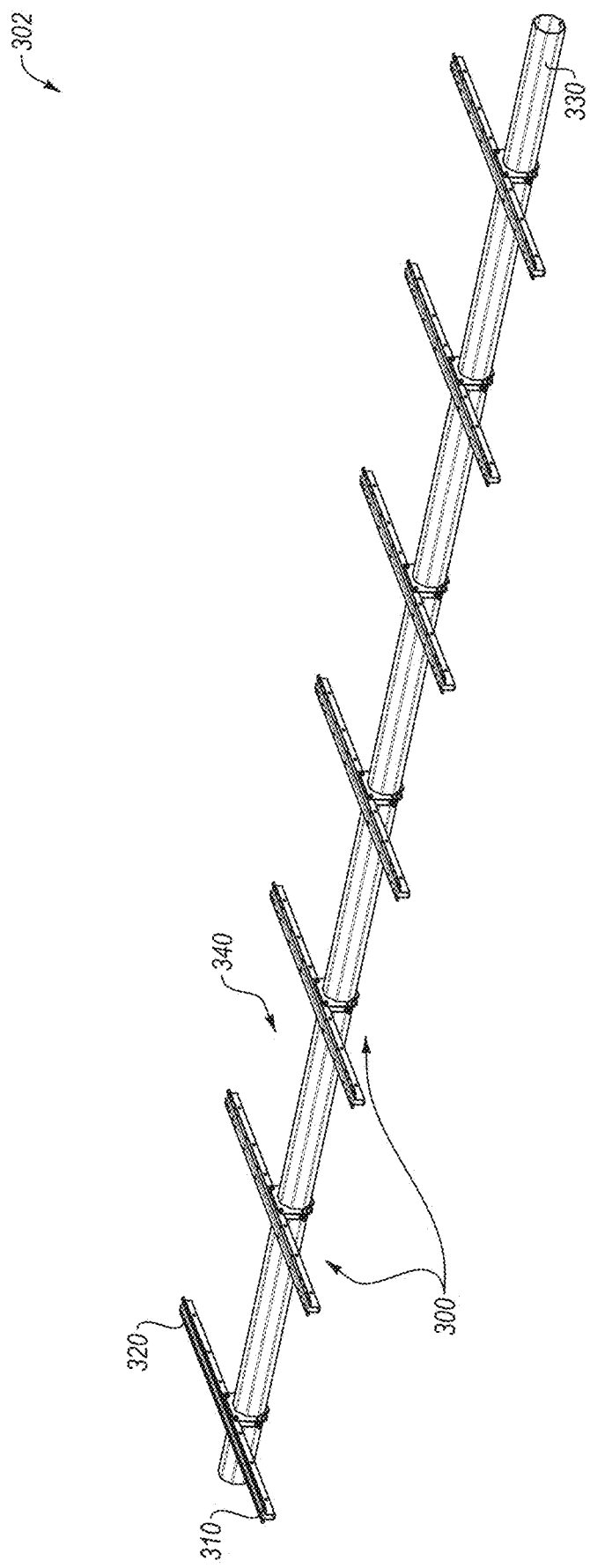
FIG. 3 illustrates a series of mounting rails in a system.

FIG. 3 illustrates a series of mounting rails 300 in a system 302 that includes the mounting rails 300 and a torque tube 330. Each of the mounting rails 300 include mounting brackets that secure the mounting rails to the torque tube 330. Each of the mounting rails 300 also include rail elements 310. Adhesive strips 320 are applied to top surfaces of the rail elements 310. In some embodiments, the torque tube 330 and the mounting rails 300 may be shipped separately as individual components to a particular solar site and assembled on-site (e.g., at an industrial solar farm). Because PV modules may be secured to the torque tube 330 via the mounting rails 300 on-site, parameters of the resulting system may be tailored to physical properties of the solar site. For example, a spacing 340 between two or more of the mounting rails 300 along the torque tube 330 may be adjusted during installation of the system to accommodate uneven terrain, the presence of obstacles (e.g., foliage or rocks), anticipated conditions (e.g., environmental conditions), or any other characteristics associated with the solar site.

Additionally or alternatively, on-site assembly of the system may facilitate more efficient shipping of components, such as of the mounting rails 300 and PV modules, to the solar site. Generally, assembly of some or all of the components associated with the system off-site (e.g., at a manufacturing facility) may result in inefficiencies due to space requirements when a PV module is attached to a rail prior to shipment.

Figure 4A:
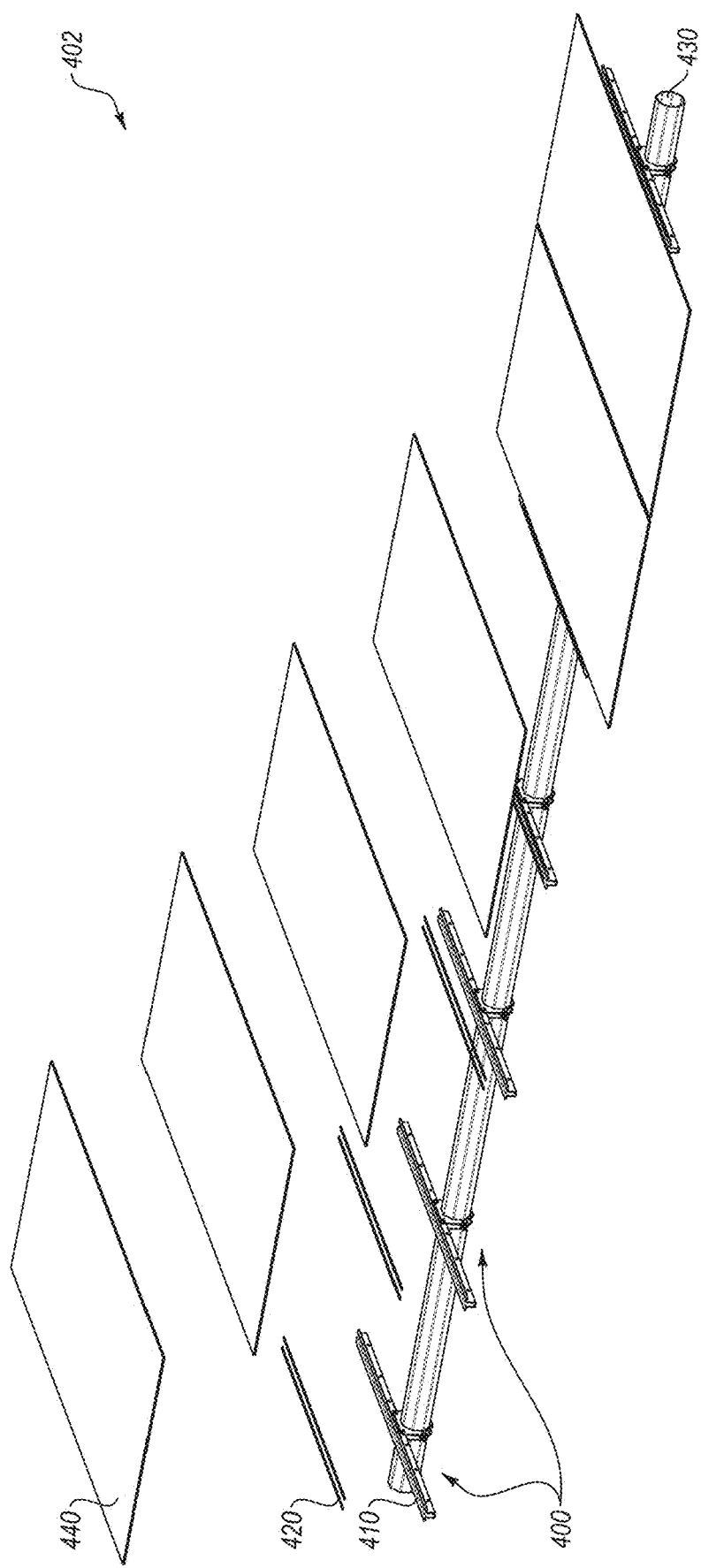
FIGS. 4A and 4B illustrate installation, at a solar site, of PV modules on a torque tube via mounting rails.
Figure 4B:
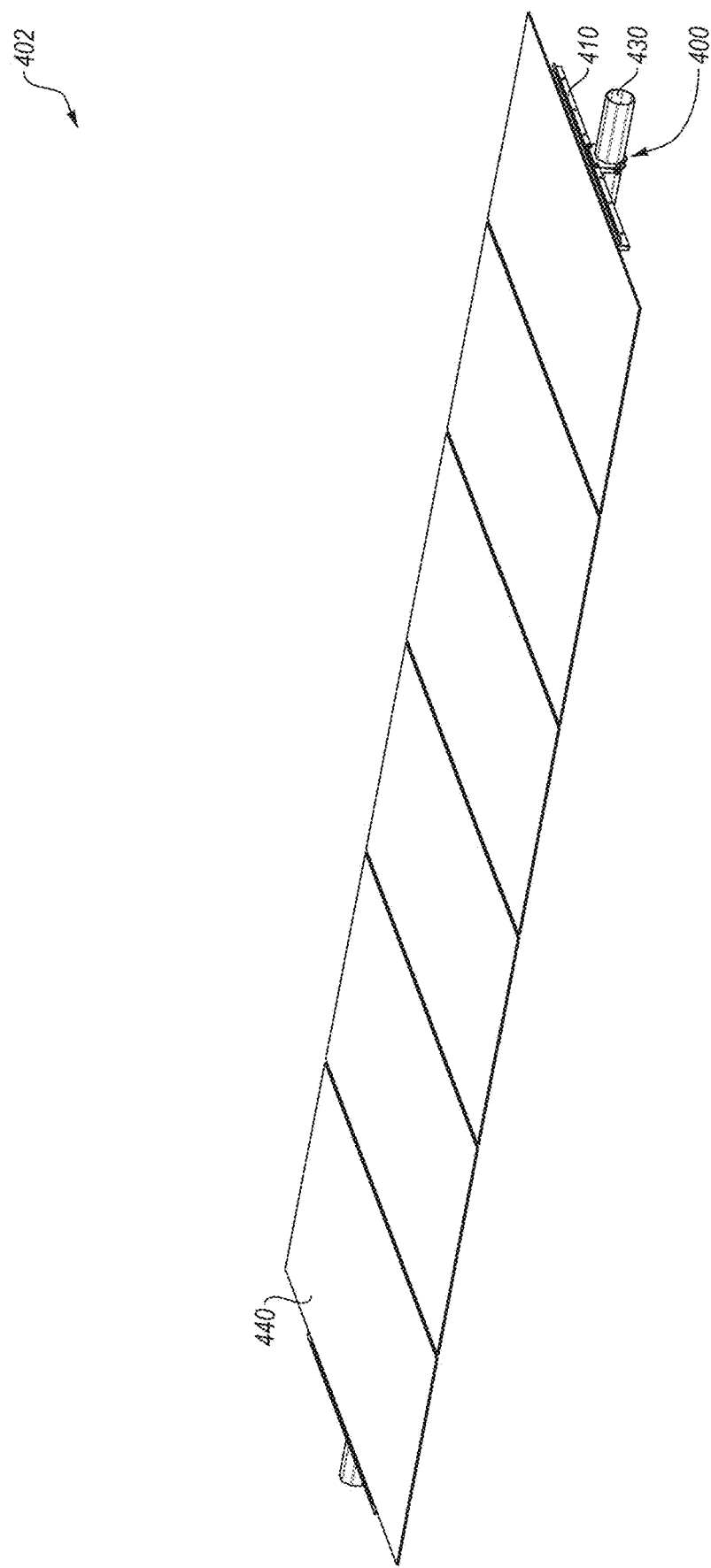

FIGS. 4A and 4B illustrate installation, at a solar site, of PV modules 440 on a torque tube 430 via mounting rails 400 in a system 402. As illustrated in FIG. 4A, the PV modules 440 may be laid on top of rail elements 410 of the mounting rails 400 with adhesives 420 interposed between top surfaces of the rail elements 410 and back surfaces of the PV modules 440. In some embodiments, the PV modules 440 may be transported to the solar site with or without rail the mounting rail 400 pre-installed. Consequently, transportation of the PV modules 440 to the solar site may be improved because a greater number of PV modules 440 may be transported at the same time using a given transportation vehicle.

Figure 5:
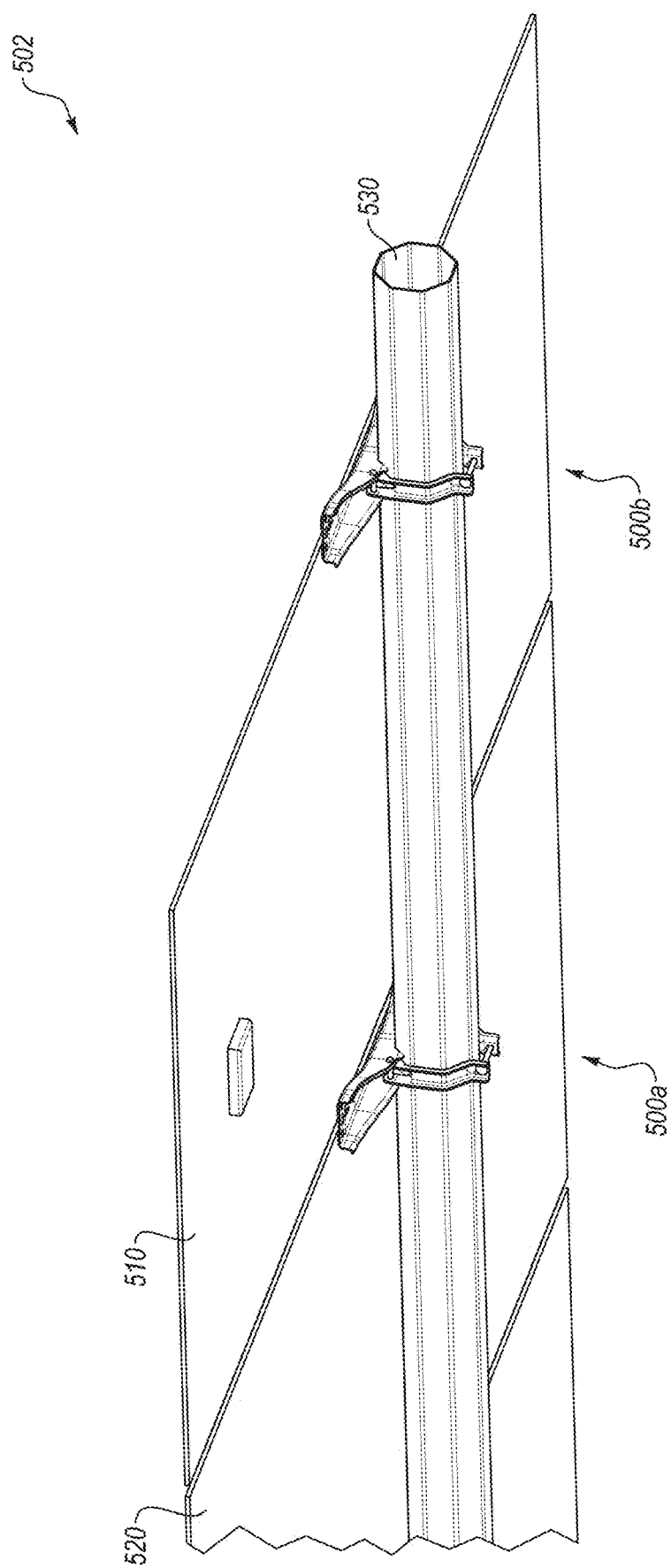
FIG. 5 illustrates a perspective view of a system that includes a pair of mounting rails according to another embodiment of the present disclosure.

FIG. 5 illustrates a perspective view of a system 502 that includes a pair of mounting rails 500a and 500b according to another embodiment, a first PV module 510, a second PV module 520, and a torque tube 530. The mounting rails 500a and 500b include a mounting bracket and a rail element. The rail element of the mounting rail 500a is secured to edges of both the first PV module 510 and the second PV module 520. The mounting brackets of the mounting rails 500a and 500b are secured to the torque tube 530.

The mounting rails 500a and 500b may be coupled to the torque tube 530 at various points along the length of the torque tube 530. In some embodiments, the mounting rails 500a and 500b may be positioned along the length of the torque tube 530 with a spacing between two adjacent mounting rails being approximately equal to a width of the first and second PV modules 510 and 520. With such a spacing between the mounting rails 500a and 500b, the mounting rails 500a and 500b may be configured to interface with the first PV module 510 along a first section of the top surface of the rail element of mounting rail 500a and with the second PV module 520 along a second section of the top surface of the rail element of mounting rail 500a. As such, a single mounting rail may be positioned and configured to interface with two adjacent PV modules.

Additional PV modules may be laid adjacent to the first PV module 510 or the second PV module 520. The PV modules may be aligned with respect to the torque tube 530 and positioned based on the positions of the mounting rails 500a and 500b coupled to the torque tube 530. Setting up the torque tube 530 and the mounting rails 500a and 500b in situ at a solar site may ensure that the spacing between the mounting rails 500a and 500b and other mounting rails in the system 502 may be tailored to the solar site and the PV modules to be installed.

For example, PV modules installed on an outer perimeter of a solar site may require more support than what can be provided by mounting rails that are secured to opposing edges of the PV module. For these outer PV modules, an additional mounting rail that supports a mid-section of the PV module may be necessary. In a system where mounting rails do not arrive pre-installed on the backs of PV modules, but are installed on site, this sort of customization is possible.

Figure 6:
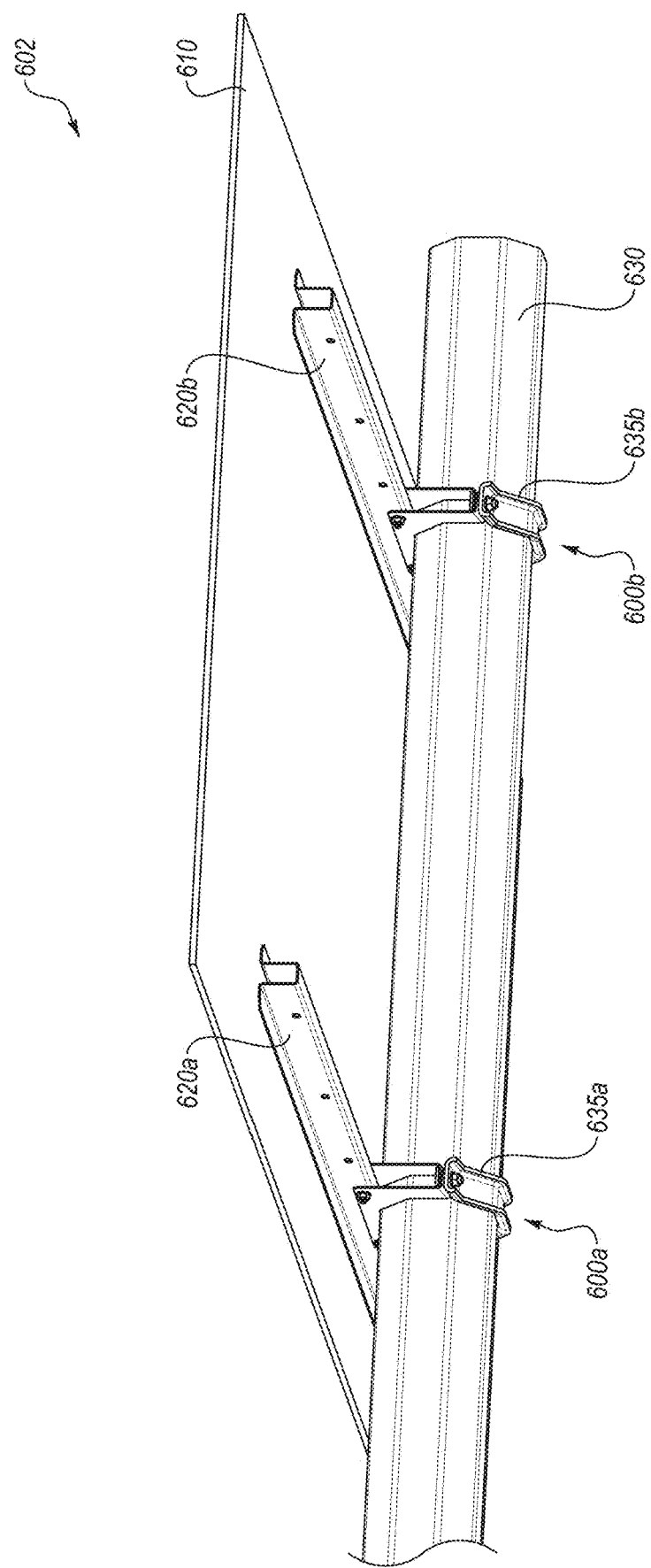
FIG. 6 illustrates a perspective view of another embodiment of mounting rails in a system that includes a first mounting rail, a second mounting rail, a PV module, and a torque tube.

FIG. 6 illustrates a perspective view of another embodiment of mounting rails in a system 602 that includes a first mounting rail 600a, a second mounting rail 600b, a PV module 610, and a torque tube 630. The mounting rails 600a and 600b include rail elements 620a and 620b, respectively. The mounting rails 600a and 600b also include mounting brackets 635a and 635b, respectively. The rail elements 620a and 620b are secured directly to the PV module 610 and the mounting brackets 635a and 635b are secured directly to the torque tube 630.

Depending on the conditions of a particular solar site, different load-bearing considerations may be important for PV modules installed at the particular solar site. For example, a solar site that is prone to experiencing stronger winds or greater amounts of rain or snowfall may install PV modules and supporting components, such as mounting rails, that increase the load-bearing capacities of the PV modules.

In some embodiments, to improve the load-bearing capacity of the PV modules, any number of mounting rails may be attached to a single PV module. For example, in the system 602 the first mounting rail 600a and the second mounting rail 600b are both coupled to the same PV module 610. Additional PV modules may be mounted on the torque tube 630 adjacent to or otherwise alongside the PV module 610 to form a row of PV modules at the location of the solar site.

Additionally or alternatively, while some PV modules coupled to the torque tube 630 may be attached using two or more mounting rails according to the system 602, other PV modules coupled to the torque tube 630 may be configured according to other configurations. For example, two PV modules may be coupled to the same torque tube 630 using shared mounting rails as described in relation to the system 502 of FIG. 5. During on-site installation, configuration of the PV modules with respect to mounting rails or other components of a module support structure may be specified according to site-specific anticipated loads, physical constraints or conditions, such as elevation changes or obstructive obstacles at the solar site.

Figure 7A:
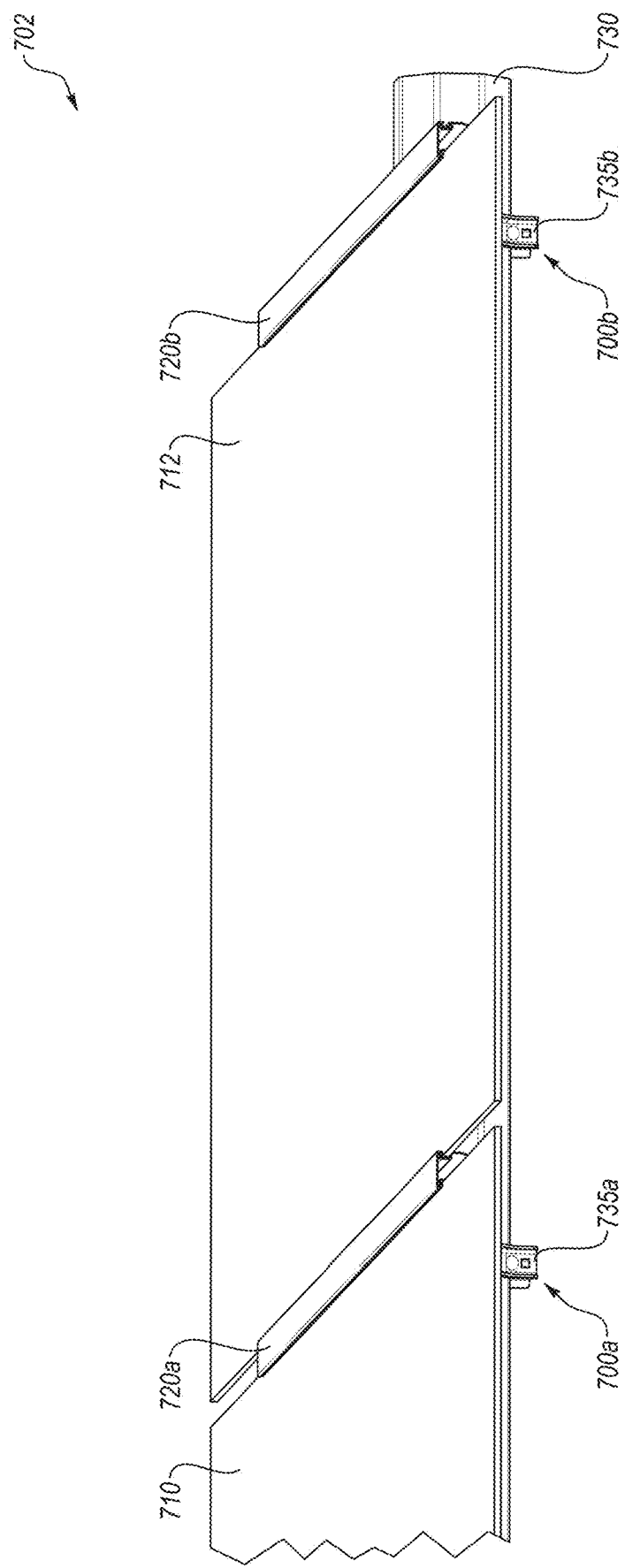
FIGS. 7A-7D illustrate various views of another embodiment of mounting rails in a system that includes a first mounting rail, a second mounting rail, a first PV module, a second PV module, and a torque tube.
Figure 7B:
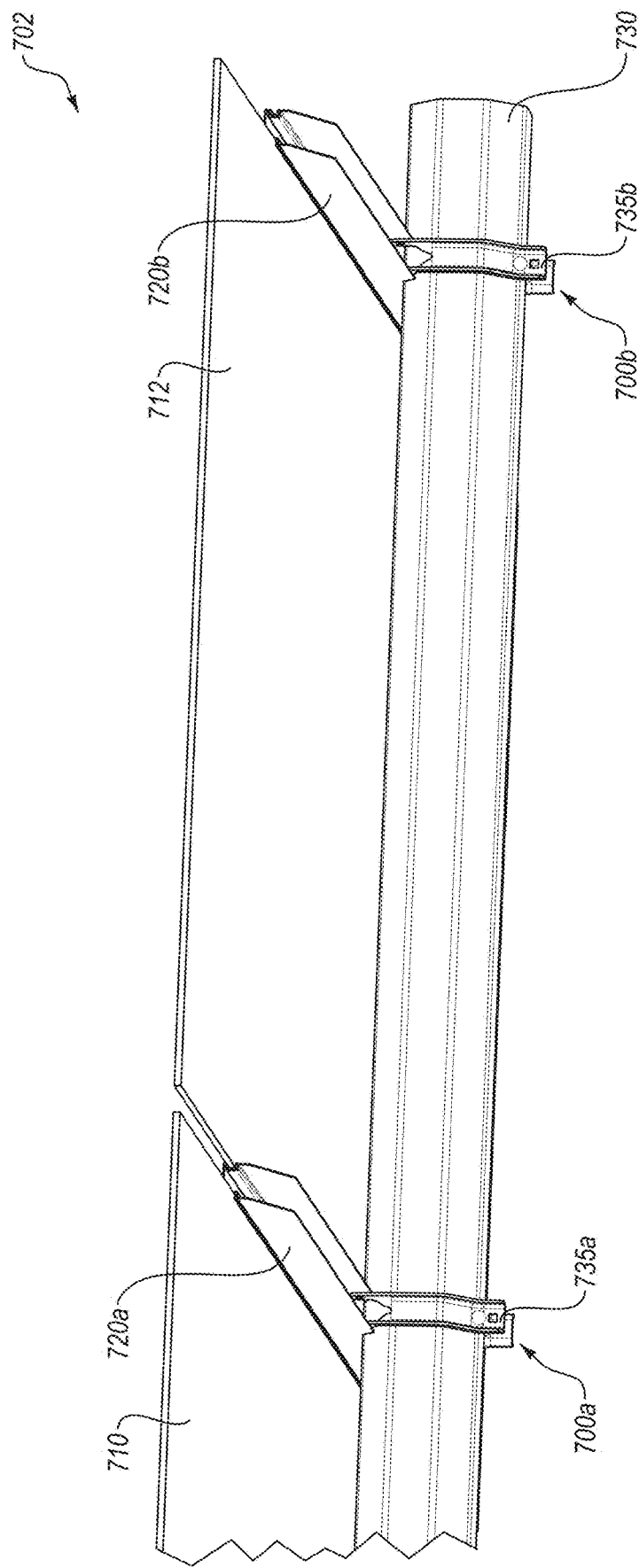
Figure 7C:
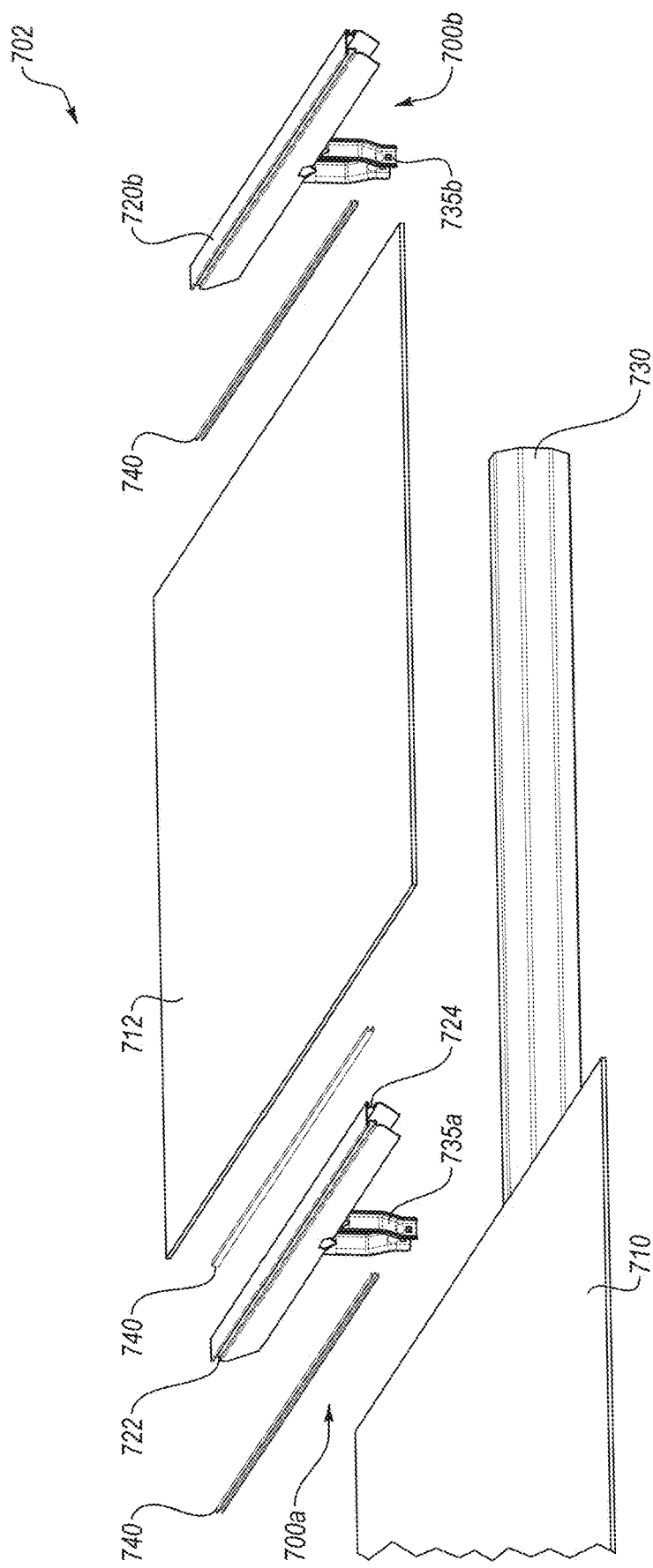
Figure 7D:
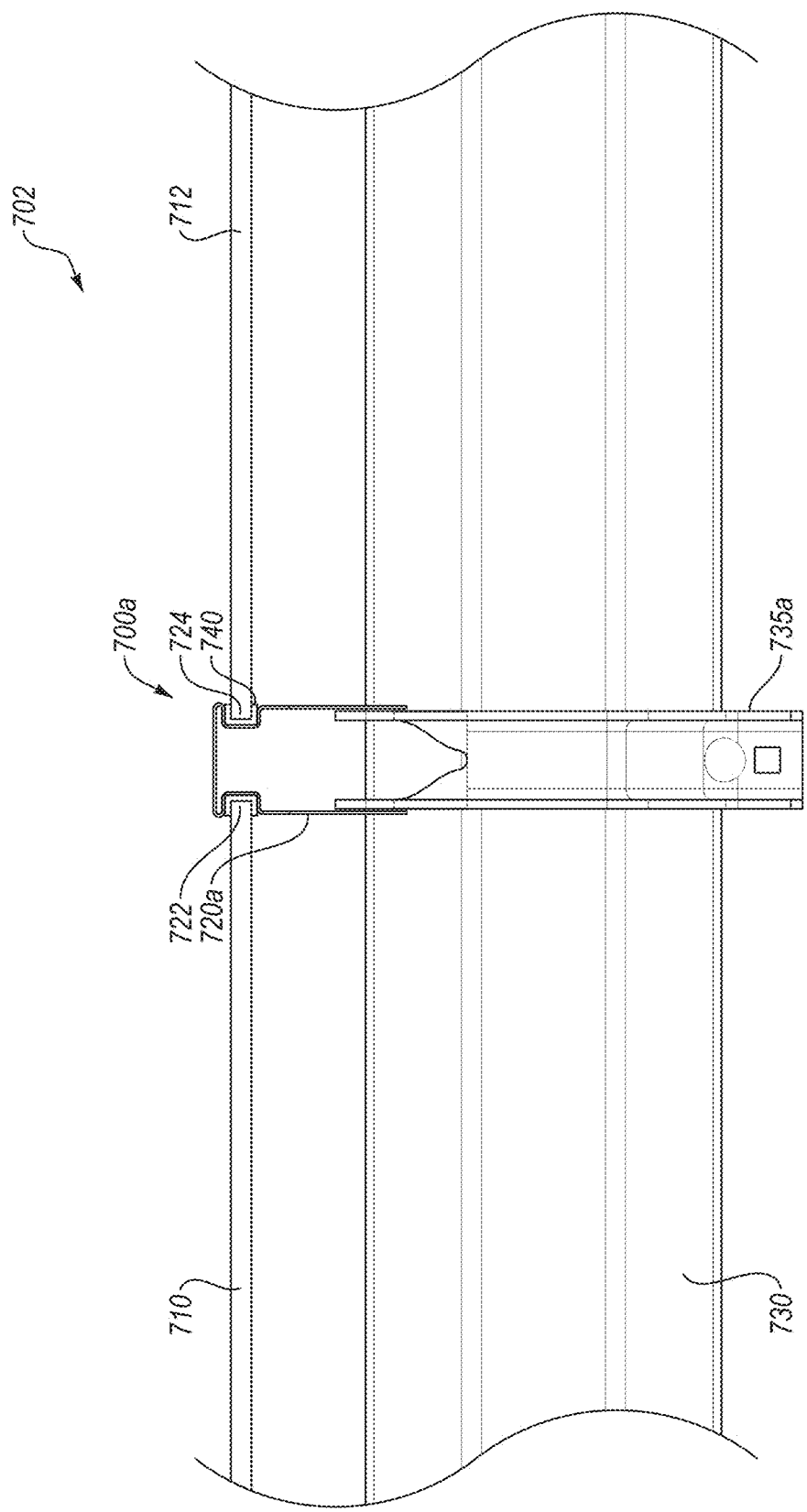

FIGS. 7A-7D illustrate various views of a fifth embodiment of mounting rails in a system 702 that includes a first mounting rail 700a, a second mounting rail 700b, a first PV module 710, a second PV module 712, and a torque tube 730. FIGS. 7A and 7B respectively illustrate a first perspective view and a second perspective view of the system 702. FIG. 7C illustrates an exploded view of the system 702, and FIG. 7D illustrates a side view of the system 702 according to one or more embodiments of the present disclosure.

As illustrated in FIGS. 7A and 7B, the mounting rails 700a and 700b include rail elements 720a and 720b (collectively referred to herein as "rail elements 720") that interface with the torque tube 730 via mounting brackets 735a and 735b (collectively referred to herein as "mounting brackets 735"). The rail elements 720 may be configured such an edge of the PV modules 710 and 712 may be slotted into channels on opposing sides of the rail elements 720 to affix the PV modules 710 and 712 to the torque tube 930.

For example, as can be seen in the FIG. 7C exploded view and the FIG. 7D side view, the rail element 720a includes a first channel 722 on one side and a second channel 724 on an opposite side. Similar slots may be included in the rail element 720b. An edge of the PV module 710 may slide into the channel 722 and an edge of the PV module 712 may slide into the channel 724 An adhesive 740 may be applied between the channel 722 and the PV module 710 and between the channel 724 and the PV module 712 to facilitate a stronger connection between the PV modules 710 and 712 and the rail element 720a. Additionally or alternatively, the adhesive 740 may prevent the PV modules 710 and 712 from sliding along the length of the channel 722 or 724 during rotation of the torque tube 730, which may consequently result in movement and misalignment of the PV modules 710 and 712.

Installation of the PV modules 710 and 712 according to the system 702 may be performed at a solar site. At the solar site, the spacing between the mounting rails 700a and 700b may be adjusted during installation of the PV modules 710 and 712 to customize a row of PV modules according to site-specific physical constraints. In some embodiments, the adhesive 740 may be applied on site after the rail element 720a has been clamped to the torque tube 730. An edge of the PV module 710 may be inserted into the channel 722 of the rail element 720a with the adhesive 740 applied and an edge of the PV module 712 may be inserted into the channel 724 of the rail element 720a with the adhesive 740 applied. Thus, a single rail element 720a may be used to secure two PV modules to the torque tube 730, and each PV module coupled to the torque tube 730 may be interposed between two rail elements 720. A similar installation process may be followed to secure opposite sides of the PV modules 710 and 712 to adjacent mounting rails, including mounting rail 700b.

Figure 8A:
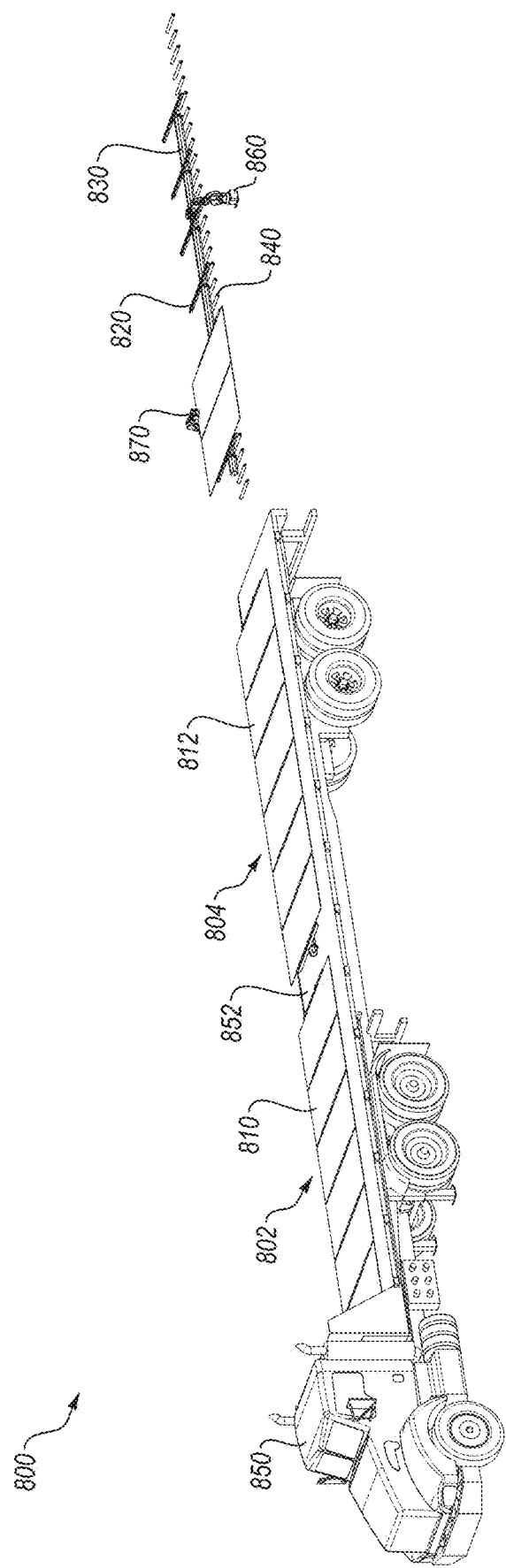
FIG. 8A illustrates an on-site assembly environment that uses one or more mounting rails according to one or more embodiments of the present disclosure.

FIG. 8A illustrates an on-site assembly environment 800 that uses one or more mounting rails according to one or more embodiments of the present disclosure. In some embodiments, the on-site assembly environment 800 may implement any of the mounting rails described in the present disclosure, including the mounting rails 100, 200, 300, 400, 500, 600, and 700, or some combination thereof. For instance, a first row 802 of PV modules 810 may be prepared on site using mounting rails 100, while a second row 804 of PV modules 812 may be prepared on site using mounting rails 200.

The mounting system used in the on-site assembly environment 800 may depend on the physical constraints of the particular solar site. For example, the mounting rails 100 may be well-suited for solar sites that include generally flat terrain such that installation of the PV modules 810 in densely spaced rows is advantageous. As an additional or alternative example, solar sites that are predicted to experience higher frequencies of inclement weather that result in the PV modules 812 experiencing greater stress forces or to rotate more frequently may be installed using mounting rails 200.

In some embodiments, the on-site assembly environment 800 may include a temporary assembly station that may be set up at a particular solar site to perform the assembly of components associated with a PV module system, such as coupling the PV modules 810 to a torque tube 830. For example, the temporary assembly station may involve a platform 852 of a transportation vehicle 850 onto which assembled rows of PV modules 810 and 812 or other components of the PV module system may be placed. The transportation vehicle 850 may move the assembled rows of PV modules 810 and 812 to a target location in the solar site at which the assembled rows of PV modules 810 and 812 are to be installed.

Figure 8B:
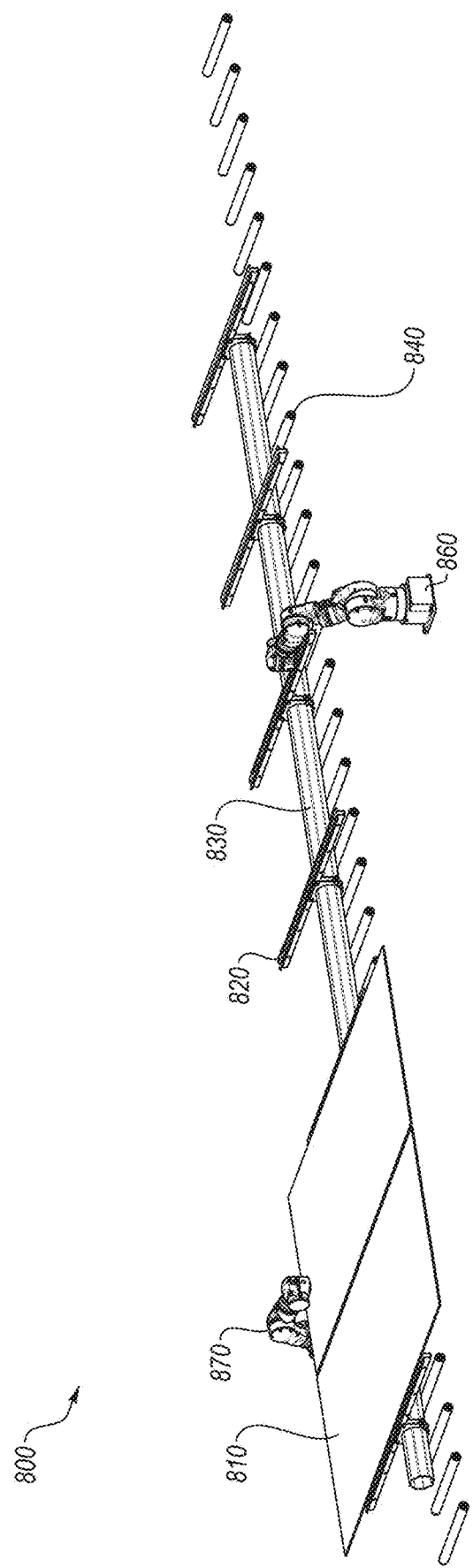
FIG. 8B illustrates autonomous or user-guided assembly of PV modules in the on-site assembly environment using one or more mounting rails according to the present disclosure.

FIG. 8B illustrates autonomous or user-guided assembly of the PV modules 810 in the on-site assembly environment 800 using one or more of the mounting rails according to the present disclosure. The assembly of the PV modules 810 in the on-site assembly environment 800 may involve positioning the torque tube 830 on support beams 840 and coupling a series of mounting rails 820 to the torque tube 830. In some embodiments, a first assembly assistance machine 860 may be deployed to facilitate attachment of the mounting rails 820 to the torque tube 830. Additionally or alternatively, the first assembly assistance machine 860 may be deployed to facilitate application of adhesives to sections of the mounting rails 820 as described in further detail below in relation to FIG. 9. The on-site assembly environment 800 may include a second assembly assistance machine 870 that is deployed to move and position the PV modules 810 onto the mounting rails 820 so that the PV modules 810 are secured to the torque tube 830 as a row of PV modules 810, such as the first row 802 or the second row 804 described in relation to FIG. 8A.

In some embodiments, the first assembly assistance machine 860 and the second assembly assistance machine 870 may include robotic arms that are remotely operated by a user. The user may be presented with a control console on site that allows the user to guide movement of the robotic arm via one or more input commands. Additionally or alternatively, the first and the second assembly assistance machines 860 and 870 may be autonomously operated. For example, a set of assembly parameters (e.g., an assembly platform height, a torque tube thickness, a torque tube length, a classification of the mounting rails 820 to be installed, a general spacing distance of the mounting rails 820 to be installed, a specific spacing distance between two particular mounting rails 820 to be installed, any other parameters related to the assembly of the row of PV modules 810, or some combination thereof) may be specified, and the robotic arms may autonomously operate to couple the mounting rails 820 to the torque tube 830 or secure the PV modules 810 to the torque tube 830 according to the specified parameters.

Figure 9:
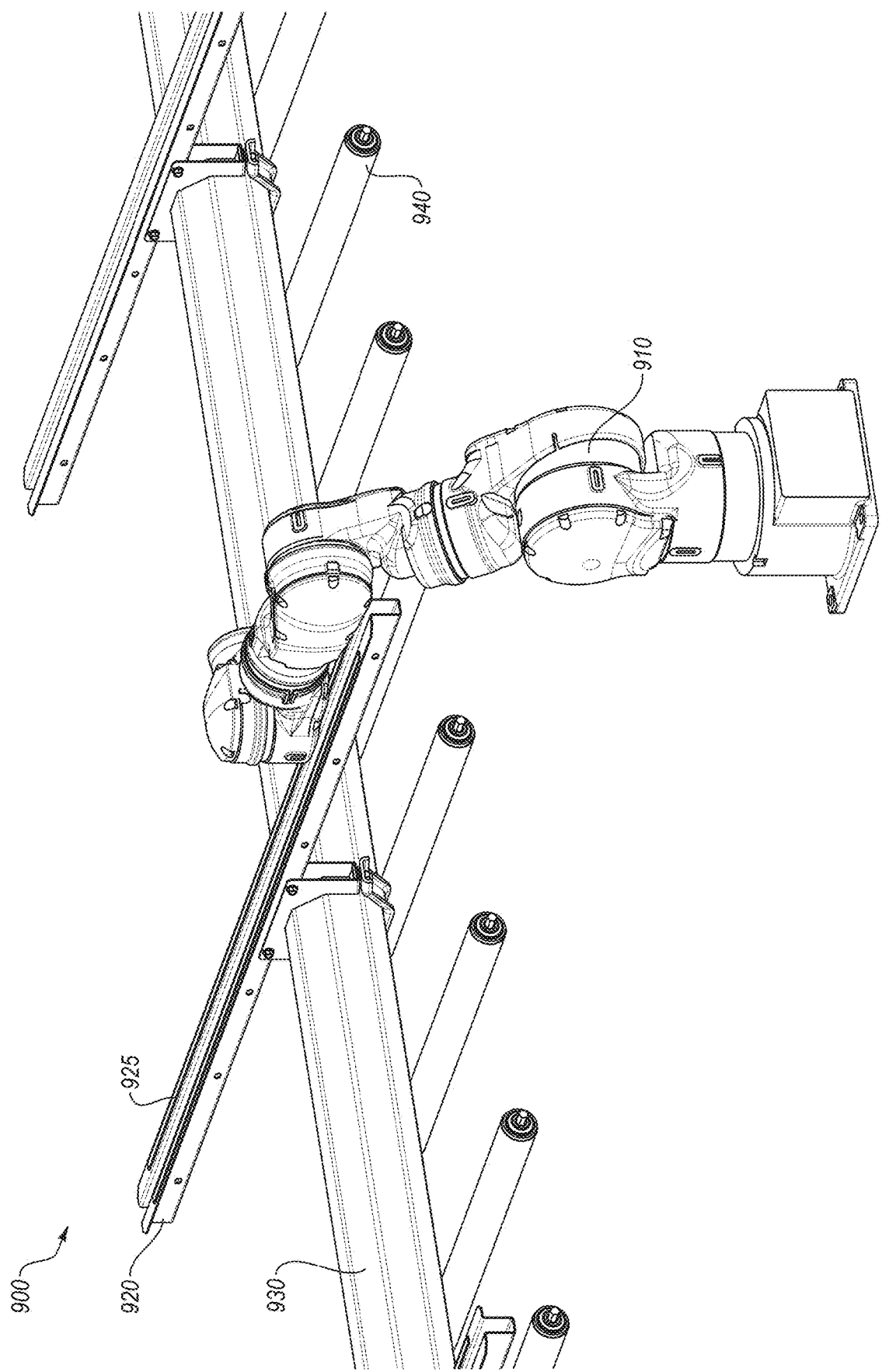
FIG. 9 illustrates application of an adhesive to a mounting rail in an on-site assembly environment according to one or more embodiments of the present disclosure.

FIG. 9 illustrates application of an adhesive to a mounting rail in an on-site assembly environment 900 according to one or more embodiments of the present disclosure. An adhesive application machine 910 may interact with mounting rails 920 that are coupled to a torque tube 930 to apply an adhesive to the mounting rails 920 in the solar site. By operating autonomously or remotely at the on-site assembly environment 900, the adhesive application machine 910 may be able to more accurately apply the adhesives to the mounting rails 920 with consideration for the physical parameters associated with that particular solar site.

In some embodiments, the adhesive application machine 910 may remain in a fixed position during installation of the mounting rails 920 or application of the adhesives to the mounting rails 920. Support beams 940 on which the torque tube 930 is positioned may rotate to move the torque tube 930 in the direction of rotation and provide the next location at which the adhesive may be applied to a subsequent mounting rail 920 coupled to the torque tube 930 at a later position. Additionally or alternatively, the adhesive application machine 910 may include some degree of movement along the length of the torque tube 930 such that the adhesives may be applied to one or more of the mounting rails 920 without moving the torque tube 930 along the set of support beams 940.

Figure 10:
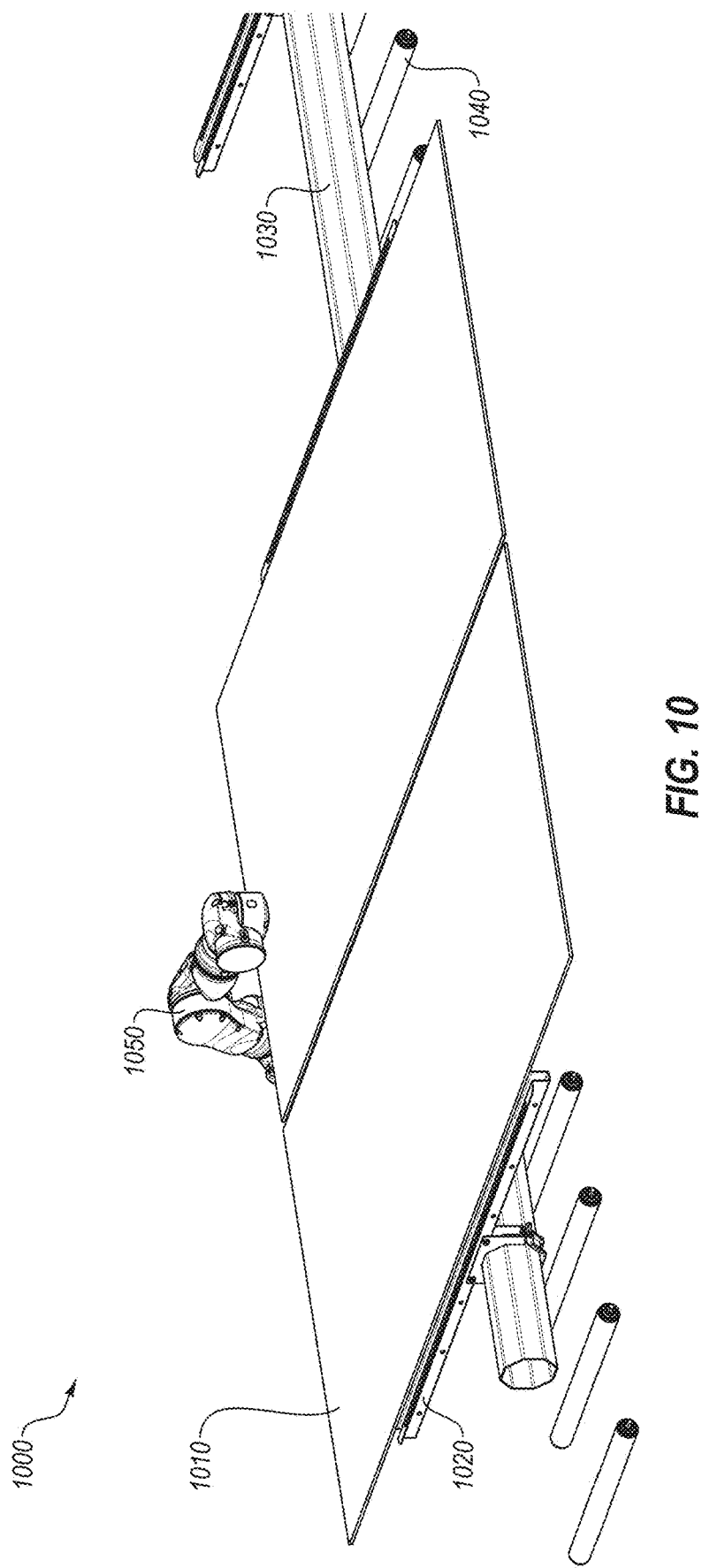
FIG. 10 illustrates autonomous or user-guided installation of PV modules onto a module support structure with an adhesive applied in an on-site assembly environment according to one or more embodiments of the present disclosure.

FIG. 10 illustrates autonomous or user-guided installation of PV modules 1010 onto a module support structure with an adhesive applied in an on-site assembly environment 1000 according to one or more embodiments of the present disclosure. The PV modules 1010 may be positioned and laid onto mounting rails 1020 attached to a torque tube 1030 to form a row of PV modules 1010 that may be transported to and installed at a particular location in the solar site.

A PV module installation machine 1050 may be deployed to autonomously or remotely operate and facilitate attachment of the PV modules 1010 to the torque tube 1030. The PV module installation machine 1050 may be configured to pick up PV modules 1010 and position the PV modules 1010 along the torque tube 1030 based on where adhesives are applied to the mounting rails 1020. In some embodiments, the PV module installation machine 1050 may remain in a fixed position during installation of the PV modules 1010 with the torque tube 1030 moving its length based on rotation of support beams 1040 placed under the torque tube 1030. The torque tube 1030 may be moved an interval distance after installation of a PV module 1010 such that the PV module installation machine 1050 places a subsequent PV module adjacent to the installed PV module 1010. The movement of the torque tube 1030 followed by placement of subsequent PV modules 1010 may be repeated until a row of PV modules 1010 is assembled. Additionally or alternatively, the PV module installation machine 1050 may be configured to fully or partially move along the length of the torque tube 1030 such that the PV module installation machine 1050 may place PV modules 1010 along the torque tube 1030 with or without the assistance of the rotating support beams 1040.

Figure 11:
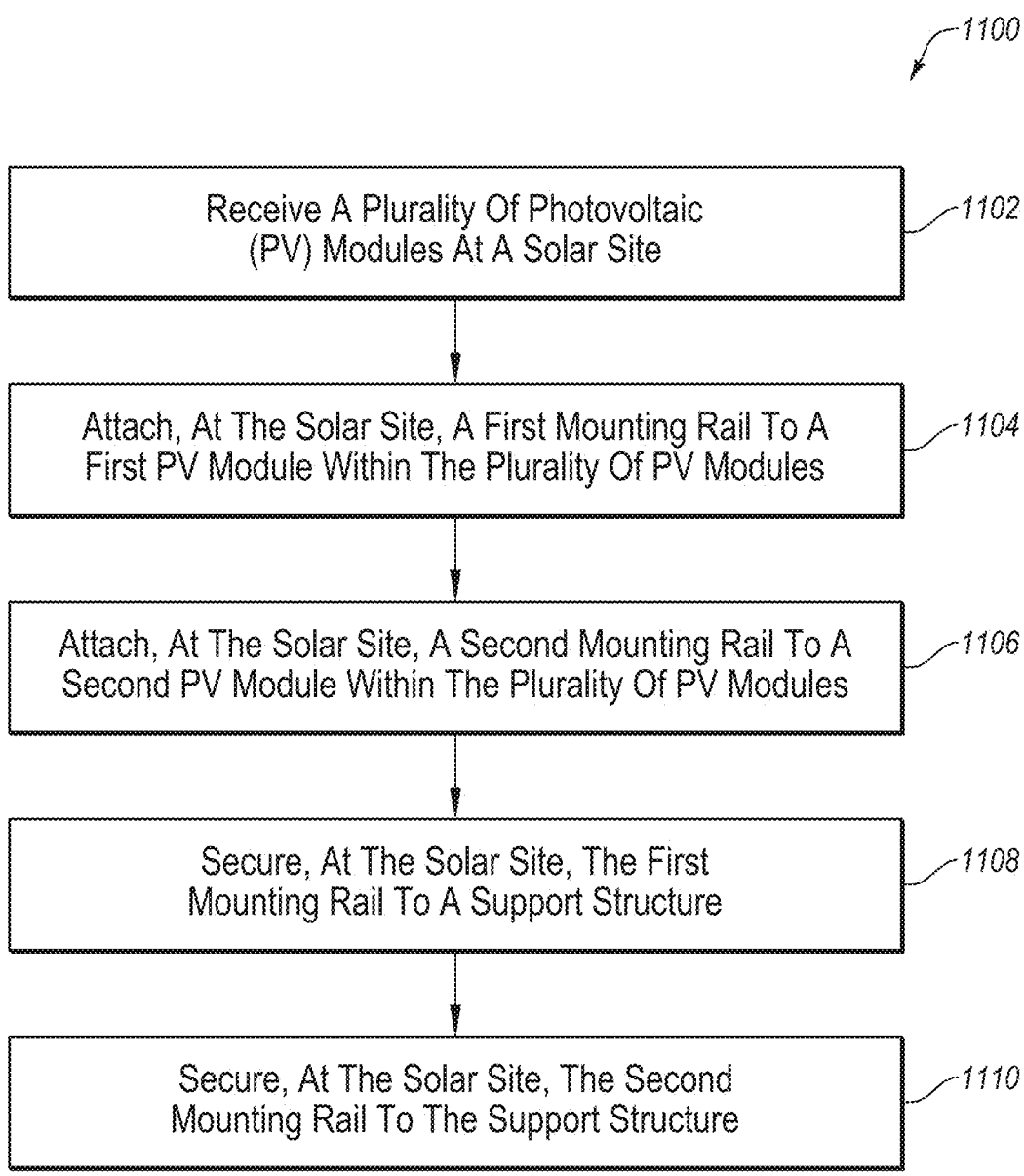
FIG. 11 is a flowchart of an example method of on-site installation of PV modules according to one or more embodiments of the present disclosure.

FIG. 11 is a flowchart of an example method 1100 of on-site installation of PV modules according to one or more embodiments of the present disclosure. Although illustrated with discrete blocks, the steps and operations associated with one or more of the blocks of the method 1100 may be divided into additional blocks, combined into fewer blocks, or eliminated, depending on the particular implementation.

The method 1100 may begin at block 1102, where PV modules may be received at a solar site. The PV modules may be received from one or more off-site manufacturing facilities that assemble PV cells with a protective back surface (e.g., a glass, metallic, or polymeric plate) and a transparent glass sheet for covering a front surface of the assembled PV cells to produce a PV module. The PV modules may be produced with standard specifications such that each of the received PV modules includes the same or similar specifications within a particular threshold tolerance level. In some embodiments, each of the received PV modules may lack structure, such as a rail, that is configured to facilitate attachment of the PV modules to a support structure, such as a torque tube. Thus, in some embodiments, the receipt of the PV modules may be limited to the PV modules themselves without any additional hardware that has been secured to the PV modules prior to shipment.

At block 1104, a first mounting rail may be attached to a first PV module at the solar site. In some embodiments, the first mounting rail may be directly attached to the first PV module using an adhesive. For example, the first mounting rail may be attached to a backside of the first PV module by applying the adhesive to a surface of the first mounting rail (e.g., a top surface of a rail element of the first mounting rail) and interfacing the first mounting rail with the backside of the first PV module along the surface to which the adhesive is applied. Additionally or alternatively, the first mounting rail may be attached to one or more edges of the first PV module via the adhesive. For example, in one embodiment, the first mounting rail may include a channel into which the one or more edges of the first PV module may be inserted. The adhesive may be applied inside of the channel prior to inserting the one or more edges of the first mounting rail into the channel so that an interface between the channel of the first mounting rail and the first PV module is further secured by the adhesive.

At block 1106, a second mounting rail may be attached to a second PV module at the solar site. In some embodiments, the second mounting rail may be directly attached to the second PV module using an adhesive. In these and other embodiments, the second mounting rail may be attached to a backside of the second PV module via the adhesive. Additionally or alternatively, the second mounting rail may be attached to one or more edges of the second PV module via the adhesive.

Although the steps of the method 1100 are illustrated in FIG. 11 as discrete actions, various actions may be divided into additional actions, combined into fewer actions, reordered, expanded, or eliminated, depending on the desired implementation. For example, in one embodiment, the sequence of steps could include 1102 first, 1108 second, 1110 third, 1104 fourth, and 1106 fifth.

In some embodiments, the second mounting rail may be attached to the second PV module in the same or a similar manner as the first mounting rail is attached to the first PV module. Additionally or alternatively, attachment of the second mounting rail to the second PV module may be based on the particular specifications or an intended purpose of the second PV module. For example, the first mounting rail may include a rail having a first length, and the second mounting rail may include a rail having a second length. The first length of the first mounting rail may be different from the second length of the second mounting rail. In these and other embodiments, the setting of the first length for the first mounting rail and the setting of the second length for the second mounting rail may depend on loads that the first PV module and the second PV module are expected to bear during operation of the solar site. For example, a longer rail length may be specified for the first mounting rail responsive to estimating that the first PV module is expected to bear a greater load from being located along an outside section of a row of PV modules. As an additional or alternative example, a shorter rail length may be specified for the second mounting rail responsive to estimating that the second PV module is expected to bear a lighter load from being located along an inner section of the row of PV modules and because the solar site is set in a location with mild weather conditions that are unlikely to cause damage to the PV modules.

At block 1108, the first mounting rail may be secured to a module support structure at the solar site. In some embodiments, the module support structure may be a torque tube. In these and other embodiments, the first mounting rail may be directly attached to the module support structure. For example, the first mounting rail may include a mounting bracket that is configured to interface with and couple the first mounting rail to the module support structure, such as by circumscribing and tightening around a torque tube. Securing the first mounting rail to the module support structure may result in the first PV module also being secured to the module support structure.

At block 1110, the second mounting rail may be secured to a module support structure at the solar site. In some embodiments, the module support structure may be a torque tube. In these and other embodiments, the second mounting rail may be directly attached to the module support structure in the same or a similar manner as the first mounting rail is directly attached to the module support structure.

Modifications, additions, or omissions may be made to the method 1100 without departing from the scope of the disclosure. For example, the designations of different elements in the manner described are meant to help explain concepts described herein and are not limiting. Further, the method 1100 may include any number of other elements or may be implemented within other systems or contexts than those described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A mounting rail, comprising:
   a rail element that includes a photovoltaic (PV) module mounting surface and a coupling mechanism interface, wherein the PV module mounting surface and the coupling mechanism interface are integrally formed and the rail element is configured to be attached directly to a frameless PV module via an adhesive that is applied to the PV module mounting surface; and
   a coupling mechanism attached directly to the coupling mechanism interface of the rail element, wherein the coupling mechanism is configured to be secured directly to a support structure.

2. The mounting rail of claim 1, wherein the coupling mechanism is a bracket.

3. The mounting rail of claim 1, wherein the rail element is configured to be attached to a back surface of the frameless PV module.

4. The mounting rail of claim 1, wherein the rail element is configured to be attached to at least one edge of the frameless PV module.

5. The mounting rail of claim 1, wherein the rail element is configured to be attached to a first frameless PV module and a second frameless PV module.

6. The mounting rail of claim 5, wherein the rail element is configured to be attached to an edge of the first frameless PV module and an edge of the second frameless PV module.

7. The mounting rail of claim 1, wherein the rail element forms a channel that is configured to receive an edge of the frameless PV module, at least a portion of the channel being configured to extend over a top surface of the frameless PV module.

8. A photovoltaic (PV) module system, comprising:
   a torque tube;
   a frameless PV module;
   an adhesive; and
   a mounting rail that includes:
      a rail element that includes a PV module mounting surface and a coupling mechanism interface, wherein the PV module mounting surface and the coupling mechanism interface are integrally formed and the rail element is configured to be attached directly to a frameless PV module via the adhesive that is applied to the PV module mounting surface; and
      a coupling mechanism attached directly to the coupling mechanism interface of the rail element, wherein the coupling mechanism is configured to be secured directly to the torque tube.

9. The system of claim 8, wherein the coupling mechanism is a bracket.

10. The system of claim 8, wherein the adhesive is a hot-melt adhesive.

11. The system of claim 8, wherein the adhesive extends a length of the rail element.

12. The system of claim 8, wherein the rail element is configured to be attached to a back surface of the frameless PV module.

13. The system of claim 12, wherein the back surface of the frameless PV module is glass.

14. The system of claim 8, wherein the rail element is configured to be attached to at least one edge of the frameless PV module.

15. The mounting rail of claim 3, wherein the back surface of the frameless PV module is glass.

* * * * *